United States Patent
Garcia et al.

(10) Patent No.: US 7,599,708 B2
(45) Date of Patent: Oct. 6, 2009

(54) CONTROL FOR A COMMUNICATION DEVICE

(75) Inventors: Jorge L. Garcia, Plantation, FL (US); Adrian F. Rubio, Oakland Park, FL (US)

(73) Assignee: Motorola, Inc., Schaumburg, IL (US)

( * ) Notice: Subject to any disclaimer, the term of this patent is extended or adjusted under 35 U.S.C. 154(b) by 581 days.

(21) Appl. No.: 11/005,082

(22) Filed: Dec. 6, 2004

(65) Prior Publication Data

US 2006/0121957 A1 Jun. 8, 2006

(51) Int. Cl.
*H04M 1/00* (2006.01)
*H04B 1/38* (2006.01)
*H04B 1/08* (2006.01)

(52) U.S. Cl. ............... 455/550.1; 455/575.4; 455/90.1; 455/347

(58) Field of Classification Search ............ 455/575.1, 455/575.2, 575.3, 90.1, 90.2, 550.1, 566, 455/567, 90.3, 347, 575.4; 379/419, 440, 379/433.01, 433.06, 433.07
See application file for complete search history.

(56) References Cited

U.S. PATENT DOCUMENTS

| | | | |
|---|---|---|---|
| 5,436,954 A * | 7/1995 | Nishiyama et al. ......... | 455/566 |
| 6,094,586 A * | 7/2000 | Nishiyama et al. ......... | 455/566 |
| 6,301,487 B1 * | 10/2001 | Nakamura ............... | 455/550.1 |
| 6,334,049 B1 * | 12/2001 | Nishiyama et al. ......... | 455/566 |
| 6,487,396 B1 * | 11/2002 | Sassi ..................... | 455/90.1 |
| 6,999,805 B2 * | 2/2006 | Gartrell et al. ........... | 455/575.8 |
| 7,003,268 B2 * | 2/2006 | Nishiyama et al. ......... | 455/90.3 |
| 7,058,432 B2 * | 6/2006 | Nishimoto .............. | 455/575.1 |
| 7,106,357 B2 * | 9/2006 | Fukuda et al. ........... | 348/14.02 |
| 7,333,092 B2 * | 2/2008 | Zadesky et al. ............ | 345/169 |
| 2001/0041586 A1 * | 11/2001 | Irube et al. .............. | 455/556 |
| 2002/0155857 A1 * | 10/2002 | Nishimoto ............... | 455/550 |
| 2003/0174240 A1 * | 9/2003 | Wada et al. .............. | 348/374 |

* cited by examiner

*Primary Examiner*—Tilahun Gesesse
(74) *Attorney, Agent, or Firm*—Barbara R. Doutre

(57) ABSTRACT

A control assembly (400, 500, 600) for a communication device includes a housing having a light permeable portion (406, 506, 606), along with a rotary control formed of a shaft (408), a knob (508) or belt (608) each having a surface, and a light shining light through the light permeable portion onto the surface. Light sensitive motion detection circuitry (402, 502, 602) detects movement of the surface through the light permeable portion (406, 506, 606). The control can be implemented in high profile, low profile, scroll and slider bar embodiments, all providing a sealed environment to the communication device.

16 Claims, 3 Drawing Sheets

CONTROL FOR A COMMUNICATION DEVICE

TECHNICAL FIELD

This invention relates to controls, such as rotary controls, for use on communication devices.

BACKGROUND

Communication devices, such as portable and mobile radios, often include rotary controls for volume adjustment, channel changing and the like. When designing communication devices having rotary controls, the designer is challenged by the fact that the controls can be difficult to seal and are expensive, particularly those controls having concentric and dual (push/rotate) functionality. FIG. 1 is a cross-sectional view of a prior art high profile rotary control 100.

For products requiring front-face navigational control, a substantial "z-height" 102 is required. In these types of products, a shaft 104 typically protrudes through the radio housing 106 thus requiring a seal 108. FIG. 2 provides examples of portable and mobile communication devices 202, 204 incorporating prior art high profile controls 206.

Electronic devices are increasingly becoming data capable. These devices can have long lists of text which require easy scrolling. One control that has become popular for scrolling is the scroll-wheel. FIG. 3 is an example of a prior art mechanical scroll wheel 302 located on the side of a communication device 304. However, the small diameter of the typical scroll wheel limits its ability to scroll down long lists making it very cumbersome for the user. Increasing the wheel diameter is not an option in today's ultra-compact devices. Like the high profile control discussed above, the scroll wheel control presents design challenges when it comes to environmental sealing.

Accordingly, there is a need for an improved control that is easy to implement, easy to use and facilitates sealing.

BRIEF DESCRIPTION OF THE DRAWINGS

The features of the present invention, which are believed to be novel, are set forth with particularity in the appended claims. The invention, together with further objects and advantages thereof, may best be understood by reference to the following description, taken in conjunction with the accompanying drawings, in the several figures of which like reference numerals identify like elements, and in which:

DETAILED DESCRIPTION OF THE PREFERRED EMBODIMENT

Figure 1:
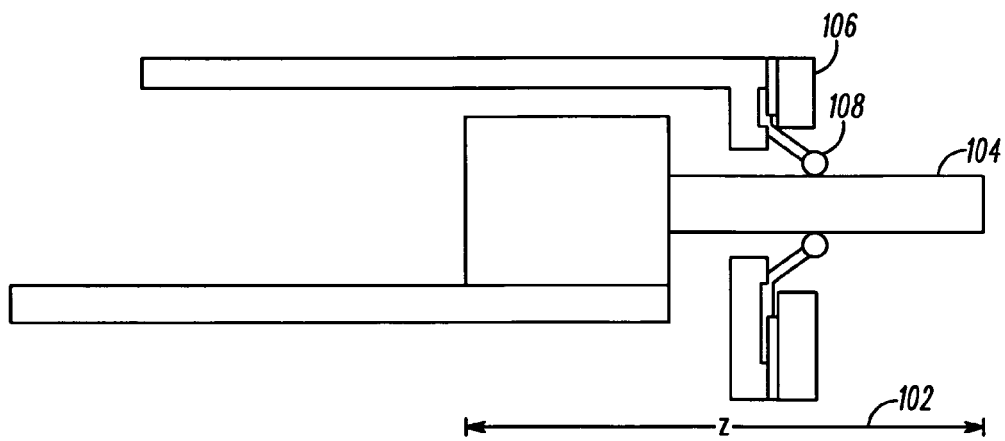
FIG. 1 is a cross-sectional view of a prior art high profile rotary control.
Figure 2:
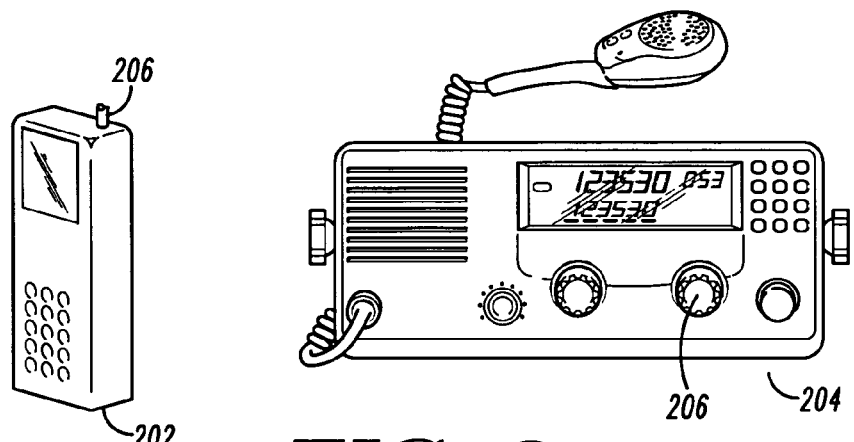
FIG. 2 is an example of portable and mobile communication devices incorporating prior art high profile controls.
Figure 3:
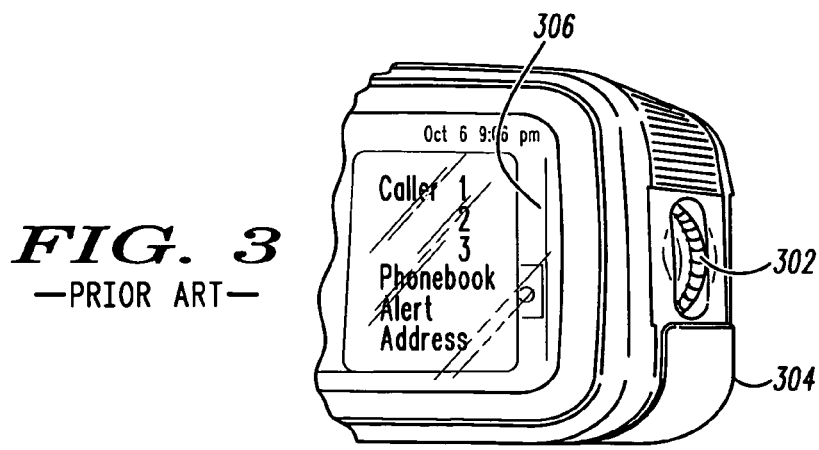
FIG. 3 is a is an example of a prior art control in the form of a scroll wheel.

While the specification concludes with claims defining the features of the invention that are regarded as novel, it is believed that the invention will be better understood from a consideration of the following description in conjunction with the drawing figures, in which like reference numerals are carried forward.

In accordance with the present invention, there is provided herein a control incorporating optical tracking technology to facilitate selecting communication device parameters. Unlike other optical encoder based rotary switches, the control formed in accordance with the present invention does not count light-interruptions but is instead based on digital signal processor detection of surface movement (both rotational and/or axial) of a rotary control. The control formed in accordance with the present invention also eliminates the need for independent sealing of the control.

Optical tracking technology is available in the form of integrated circuitry in conjunction with a light emitting diode (LED) that lights up a surface. This technology is found in optical mice used throughout the computer industry. As a computer mouse is moved along the surface, multiple snap-shots of the surface are taken. A digital signal processor analyzes the difference between each successive snap-shot to determine in which direction and how fast the mouse has moved. In accordance with the present invention, optical tracking technology is incorporated into a control to enhance single mode (rotate) and dual mode (push/rotate) functionality and scrollability in a variety of communication devices as well as the ability to independently seal the control. The control of the present invention replaces traditional internal multi-contact rotaries with light sensitive motion detection circuitry to detect the movement of a control surface through a light permeable portion of communication device housing. Both rotational and axial movement of the control can be detected.

Figure 4:
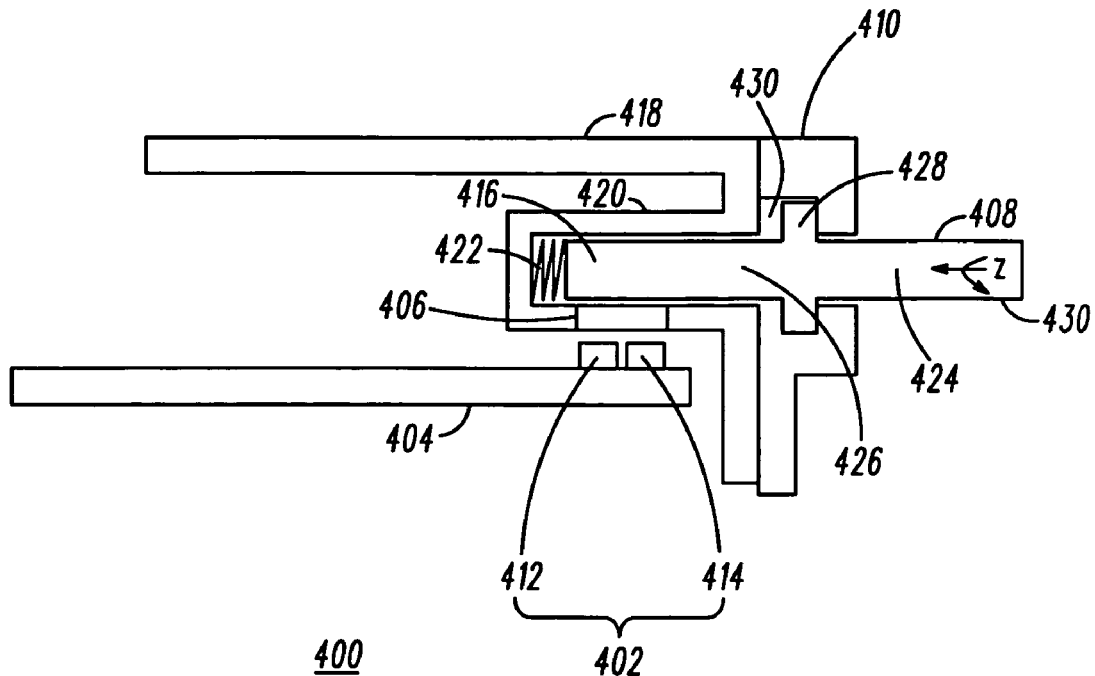
FIG. 4 is a cross-sectional view of a high profile control formed in accordance with a first embodiment of the invention.

FIG. 4 is a cross-sectional view of a control assembly 400 formed in accordance with a first embodiment of the invention. Assembly 400 provides a high profile rotary control with rotary and/or push features. Assembly 400 includes light sensitive motion detection circuitry 402, substrate 404, and a housing 418 including a light permeable portion 406 and within which a shaft 408 is coupled. In accordance with the high profile assembly 400, the rotary control is provided by the shaft 408. The light sensitive motion detection circuitry 402 is formed of a light source 412, such as an LED or other light emitting device, and motion sensor 414. The light sensitive motion detection circuitry 402 is coupled to the substrate 404, such as a printed circuit board or the like. The light permeable portion 406, formed of translucent plastic or other suitable light permeable material, covers the circuitry 402 thereby providing a seal and a lens. The shaft 408, preferably formed of steel or similar durable material, has a surface 416, which can be smooth or non-smooth. The surface 416 aligns with the light permeable portion 406.

The shaft 408 has upper and lower sections 424, 426 respectively with a bump stop 428 formed therebetween. Housing 418 includes recessed portion 420 formed therein and within which is seated the lower section 426 of shaft 408. Recessed portion 420 also includes a spring 422 to provide push capability to the shaft 408. A cover 410 retains the lower section 426 within the recessed portion 420. A cavity 430 is formed between the recessed portion 420 and the cover 410 within which the bump stop 428 can travel. The shaft 408 can push and rotate about a z-axis, shown for orientation purposes as designator 430 in FIG. 4. While shown as separate pieces, the cover 410 may be unitarily molded as part of the housing 418, if desired.

In accordance with the present invention, the light sensitive motion detection circuitry 402 detects the movement of the surface 416 of the shaft 408, as the shaft is rotated and/or pushed. This is accomplished by the light source 412 shining light through the light permeable portion 406 onto the surface 416 of the shaft 408, and the motion sensor 414 detecting rotational and axial movement of the shaft's surface through the light permeable portion. Sealing of the communication device is facilitated by having the shaft 408 remain unsealed between the cover 410 and the housing 418, while the light permeable portion 406 provides a seal for the light sensitive motion detection circuitry 402 and other communication device electronics, such as controller and transceiver circuitry (not shown).

To further facilitate the detection of surface movement, surface 416 of lower section 426 of the shaft 408 can be formed of a non-smooth surface, such as a patterned or roughened surface. Thus, the motion detection circuitry 402 can record surface movement based on the variation in the non-smooth surface, as well as speed and direction of the push and/or rotation of the control as it is manipulated by a user. The light source current can be reduced when the control is not in motion to lower overall current drain, if desired.

Figure 5:
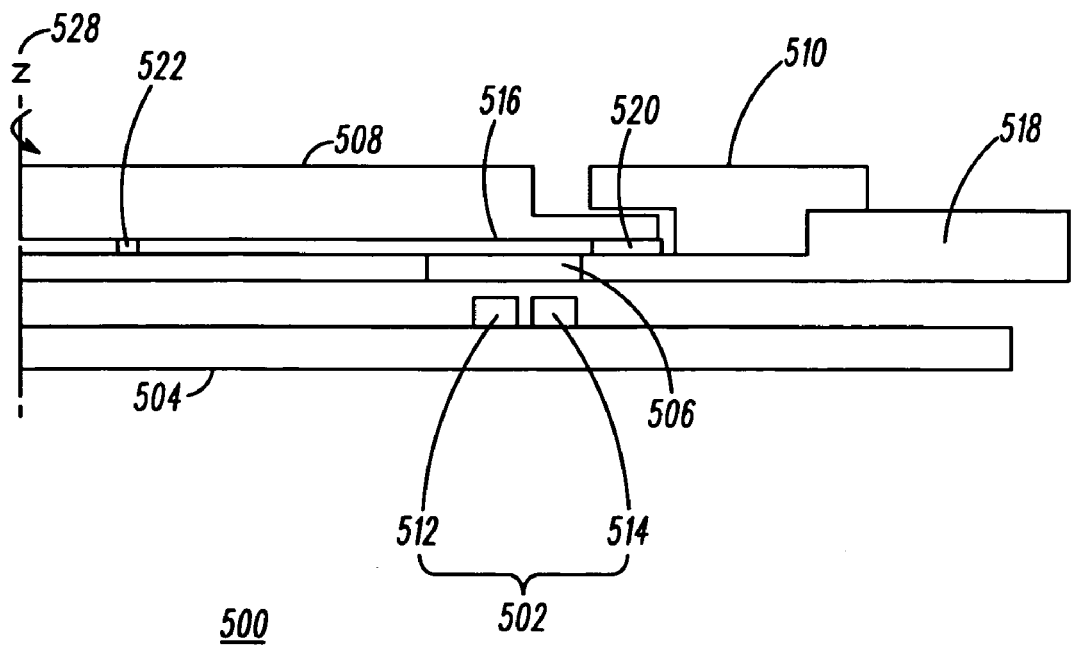
FIG. 5 is a cross sectional view of a low profile control formed in accordance with a second embodiment of the invention.

FIG. 5 is a partial cross sectional view of a control assembly 500 formed in accordance with a second embodiment of the invention. Assembly 500 provides low profile rotary control with rotational features. Light sensitive motion detection circuitry 502 is formed of light source 512 and motion sensor 514 coupled to a substrate 504. Housing 518 includes light permeable portion 506 which provides a seal over the motion detection circuitry 502 as well as other electronics (not shown). In this embodiment, the rotary control takes on the form of a knob 508. Knob 508 is coupled between a cover 510 and housing 518. The light permeable portion 506 of housing 518 is aligned over the light sensitive motion detection circuitry 502. The knob 508, which can have a smooth or a non-smooth surface 516, preferably rotates along a bearing surface 520. Control assembly 500 provides rotation about a z-axis indicated by designator 528. As the knob 508 is rotated, the light sensitive motion detection circuitry 502 detects movement of the surface 516. If the knob 508 has a non-smooth surface, variations in the surface as well as speed and direction will be detected by the light sensitive motion detection circuitry 502. This detection is accomplished by the light source 512 shining light through the light permeable portion 506 onto the surface 516 of the knob 508 as the knob is rotated.

The surface movement of the knob 508 is used as a means of detecting rotational movement of the knob 508. Since the knob 508 is located external to the light permeable portion 506, there is no need for complex seals or gaskets. The light permeable portion 506 thus provides a seal over the light sensitive motion detection circuitry 502 and other electronics, while the knob 508 remains unsealed between the cover 510 and housing 518 having light permeable portion 506. While shown as separate pieces, the cover 510 and housing 518 having light permeable portion 506 can be formed as unitarily molded housing if desired. A détente 522 can be used between the housing 518 and knob 508, if desired, to facilitate tactile feedback. Communication devices with minimal z-thickness, such as mobile radio control-heads, can benefit from the low profile embodiment of the invention.

Figure 6:
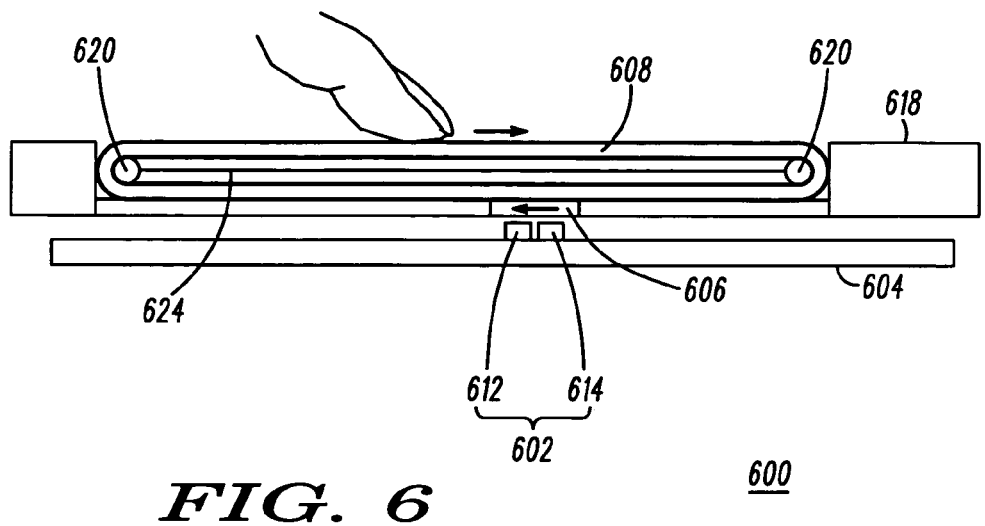
FIG. 6 is a cross-sectional view of a scroll bar control formed in accordance a third embodiment of the invention.
Figure 7:
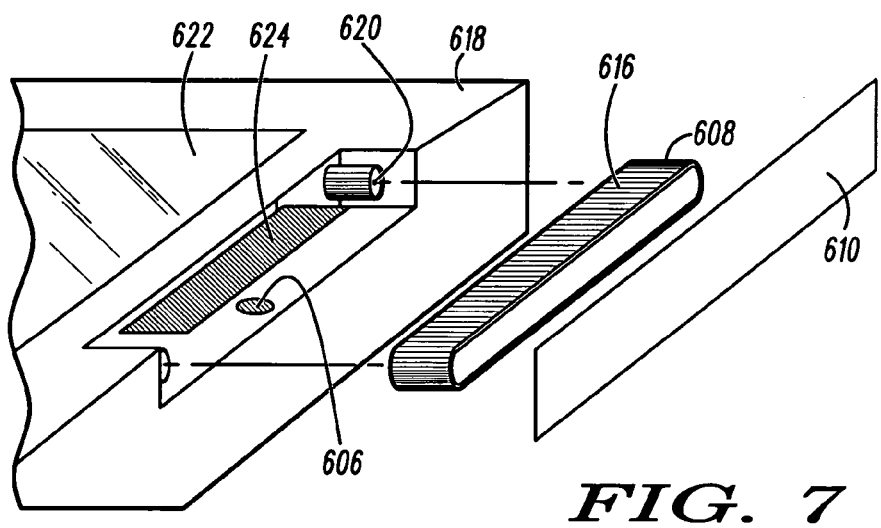
FIG. 7 is an exploded view of the scroll bar control of FIG. 6.
Figure 8:
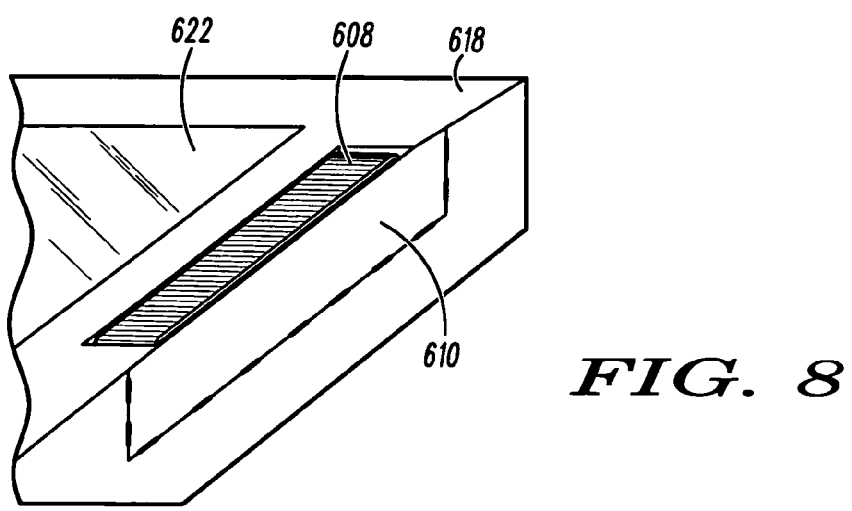
FIG. 8 is an assembled view of the scroll bar control of FIG. 7.

In accordance with a third embodiment of the invention, the use of light sensitive motion detection can also be used to provide a control for a communication device in which a rotary control is implemented as a scroll bar as shown in FIGS. 6, 7 and 8. FIG. 6 is a cross-sectional view of a scroll bar assembly 600 formed in accordance with the third embodiment of the invention. FIG. 7 is an exploded view of the scroll bar of FIG. 6. FIG. 8 is an assembled view of a scroll bar of FIG. 7. Assembly 600 includes light sensitive motion detection circuitry 602 disposed on a substrate 604, enclosed within a housing 618 of a communication device having a light permeable portion 606, with a belt 608 coupled to the housing via spindles 620 and support 624. The light sensitive motion detection circuitry 602 is formed of a light source 612 and motion sensor 614.

In accordance with the third embodiment, the belt 608 is aligned over the light sensitive motion detection circuitry 602 such that the light permeable portion 606 acts as a lens therebetween. Like the shaft and knob of the previous embodiments, the belt 608 is characterized by a surface 616. Rotation of the belt's surface is detected, in the form of speed and direction, by the light sensitive motion detection circuitry 602 thus providing scrolling capability to the communication device. Like the shaft and knob of the previous embodiments, the belt's surface 616 can be smooth or non-smooth. With a non-smooth surface, variations in the surface can be detected by the light sensitive motion detection circuitry 602 as the belt is rotated, as well as speed and direction.

As seen in FIGS. 7 and 8, belt 608 provides scrolling capability for a display 622 of the communication device. A cover 610 is shown closing off the side of the belt 608. If desired, cover 610 can be incorporated as part of the overall housing 618 to avoid having a separate piece part, as shown in FIG. 8. As seen in these completed views, the scroll bar functionality is no longer limited in diameter. The belt 608 can be as large as the display 622 or even larger if desired thus providing a much more ergonomic control than the traditional scroll wheel. Additionally, the light permeable portion 606 provides a sealed environment for the electronics of the communication device independent of the belt 608 which remains unsealed. The belt 608 can be made of a variety of materials and can include detentes, such as previously described, for improved tactile feedback.

Accordingly there has been provided a control for a communication device in which a belt is optically tracked to provide scrolling capability. Because the belt can span the entire length of a display, the user has much more control in scrolling distance and speed when compared to existing technologies. While the bar control mechanism in FIGS. 6-8 has been shown as a rotating belt, the bar control can also take on the form of a multi-position slider. The slider (smooth or non-smooth) can be slid back and forth to select communication device parameters (as opposed to continuous rotation). The communication device housing 618 having light permeable portion 606 and including light sensitive motion detection circuitry 602 functions in the same manner as described above.

Communication devices, such as cell phones, portable and mobile two-way radios, personal digital assistants, pagers and the like, can all benefit from the controls of the present invention. The controls of the present invention can be high profile, low profile, scroll or slider bar enabled depending on the design environment. Regardless of the embodiment in which it is enabled, the control of the present invention eliminates the need for any additional sealing.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A control for a communication device, comprising:
   a housing having a light permeable portion formed therein, the light permeable portion providing a lens;
   a rotary control having a surface, the rotary control coupled to the housing, wherein the rotary control comprises a scroll bar formed of a belt having a diameter that is at least one of a) same as a display positioned in the communication device, and b) greater than the display;
   a light source for shining light through the lens provided by the light permeable portion onto the surface of the rotary control; and
   a motion sensor for detecting movement of the surface of the rotary control through the light permeable portion as the rotary control is rotated.

2. A control for a communication device as described in claim 1, wherein the rotary control comprises a high profile rotary control formed of a shaft.

3. A control for a communication device as described in claim 1, wherein the rotary control comprises a low profile rotary control formed of a knob.

4. A control for a communication device as described in claim 1, wherein the rotary control comprises a multi-position slider.

5. A control for a communication device as described in claim 1, wherein the motion sensor detects rotational and push movement of the surface of the rotary control.

6. A control for a communication device as described in claim 1, wherein the lens provided by the light permeable portion also provides a seal to the light source and the motion sensor.

7. A control for a communication device as described in claim 1, wherein the surface of the rotary control comprises a smooth surface.

8. A control for a communication device as described in claim 1, wherein the surface of the rotary control comprises a non-smooth surface.

9. A control for a communication device as described in claim 1, wherein the housing provides a seal to the light source and motion sensor independently of the rotary control which remains unsealed.

10. A control for a communication device as described in claim 1, further comprising a cover for retaining the rotary control to the housing.

11. The control of claim 10, wherein the rotary control provides both push and rotate functionality between the housing and the cover.

12. A control for a communication device as described in claim 1, wherein the communication device comprises a cellular phone.

13. A control for a communication device as described in claim 1, wherein the communication device comprises a two-way radio.

14. A control for a communication device as described in claim 13, wherein the two-way radio is a portable two-way radio.

15. A control for a communication device as described in claim 13, wherein the two-way radio is a mobile two-way radio.

16. A control for a communication device as described in claim 1, wherein the communication device comprises a combination two-way radio and cellular phone.

\* \* \* \* \*